(12) United States Patent
Kim

(10) Patent No.: US 11,354,519 B2
(45) Date of Patent: Jun. 7, 2022

(54) NUMERICAL INFORMATION MANAGEMENT DEVICE ENABLING NUMERICAL INFORMATION SEARCH

(71) Applicant: Hoon Kim, Daejeon (KR)

(72) Inventor: Hoon Kim, Daejeon (KR)

( * ) Notice: Subject to any disclaimer, the term of this patent is extended or adjusted under 35 U.S.C. 154(b) by 295 days.

(21) Appl. No.: 16/480,660

(22) PCT Filed: Jan. 4, 2018

(86) PCT No.: PCT/KR2018/000189
§ 371 (c)(1),
(2) Date: Aug. 22, 2019

(87) PCT Pub. No.: WO2018/139778
PCT Pub. Date: Aug. 2, 2018

(65) Prior Publication Data
US 2020/0026762 A1    Jan. 23, 2020

(30) Foreign Application Priority Data
Jan. 24, 2017  (KR) .......................... 10-2017-0011306

(51) Int. Cl.
*G06F 40/58* (2020.01)
*G06F 16/248* (2019.01)
*G06F 16/901* (2019.01)

(52) U.S. Cl.
CPC ............ *G06F 40/58* (2020.01); *G06F 16/248* (2019.01); *G06F 16/9024* (2019.01)

(58) Field of Classification Search
None
See application file for complete search history.

(56) References Cited

U.S. PATENT DOCUMENTS 6,581,068 B1 *  6/2003  Bensoussan ...... G06F 16/24539
6,707,454 B1 *  3/2004  Barg .................... G06K 9/6253
                                                    345/440
6,980,980 B1 * 12/2005  Yeh ........................ G06F 16/283
2004/0122844 A1 *  6/2004  Malloy ................ G06F 16/283
(Continued)

FOREIGN PATENT DOCUMENTS

JP       2002117047 A    4/2002
KR   1020020061443 A    7/2002
(Continued)

OTHER PUBLICATIONS

International Search Report.

*Primary Examiner* — Howard Cortes
(74) *Attorney, Agent, or Firm* — Rabin & Berdo, P.C.

(57) ABSTRACT

The present invention relates to a numerical information management device enabling numerical information search according to a user's purpose. More particularly, the present invention relates to a numerical information management device enabling numerical information search comprising: a DB which separately stores cube data having a set row structure including at least one of a temporal viewpoint recording temporal information, spatial viewpoint recording spatial information, and a user viewpoint recording information other than the temporal information and the spatial information and a numerical value and metadata for analyzing the cube data and stores at least one graph template; a search unit receiving a search keyword and a search option; and a content providing unit which extracts metadata corresponding to the input search keyword and search option, extracts and analyzes the corresponding cube data using the extracted metadata, and generates and provides at least one graph.

12 Claims, 11 Drawing Sheets

(56) References Cited

U.S. PATENT DOCUMENTS

| | | | |
|---|---|---|---|
| 2007/0022093 A1* | 1/2007 | Wyatt | G06F 16/283 |
| 2007/0088689 A1* | 4/2007 | Cras | G06F 16/2428 |
| 2007/0179975 A1* | 8/2007 | Teh | G06Q 10/10 |
| 2008/0133568 A1* | 6/2008 | Grosset | G06F 16/288 |
| 2010/0318537 A1* | 12/2010 | Surendran | G06F 16/36 |
| | | | 707/759 |
| 2012/0221574 A1* | 8/2012 | Murakami | G06F 16/901 |
| | | | 707/739 |
| 2013/0031137 A1* | 1/2013 | Chen | G06F 16/283 |
| | | | 707/797 |
| 2013/0097177 A1* | 4/2013 | Fan | G06F 16/221 |
| | | | 707/748 |
| 2013/0125057 A1* | 5/2013 | Kashik | G06F 3/048 |
| | | | 715/852 |
| 2013/0339291 A1* | 12/2013 | Hasner | G06F 16/283 |
| | | | 707/601 |
| 2014/0114970 A1* | 4/2014 | Prabu | G06F 16/248 |
| | | | 707/736 |
| 2014/0164071 A1* | 6/2014 | English | G06F 16/283 |
| | | | 705/7.37 |
| 2014/0278813 A1* | 9/2014 | Grosset | G06Q 10/0637 |
| | | | 705/7.36 |
| 2014/0279832 A1* | 9/2014 | Vivalda | G06F 16/84 |
| | | | 707/602 |
| 2014/0280284 A1* | 9/2014 | Emanuel | G06F 16/951 |
| | | | 707/766 |
| 2014/0358811 A1* | 12/2014 | Cama | G06Q 10/00 |
| | | | 705/325 |
| 2015/0235294 A1* | 8/2015 | Chang | G06Q 30/0625 |
| | | | 705/26.62 |
| 2016/0350950 A1* | 12/2016 | Ritchie | G06F 40/177 |
| 2017/0116228 A1* | 4/2017 | Alberg | G06F 16/9024 |
| 2017/0147551 A1* | 5/2017 | Kalisz | G06F 16/283 |
| 2017/0161829 A1* | 6/2017 | Mazier | G06Q 40/06 |
| 2017/0286454 A1* | 10/2017 | Saeki | G06F 16/90 |
| 2019/0129906 A1* | 5/2019 | Keen | G06F 16/9024 |

FOREIGN PATENT DOCUMENTS

| | | |
|---|---|---|
| KR | 101213925 B1 | 12/2012 |
| KR | 1020140065611 A | 5/2014 |
| KR | 101505858 | 3/2015 |

* cited by examiner

| T0 | T1 | T2 | T3 | T4 | T5 | T6 | L0 | L1 | L2 | L3 | L4 | L5 | L6 | | value |
|----|----|----|----|----|----|----|------|-------|----|----|----|----|----|------|----------------|
| 2015 | 7 | | | | | | Asia | Korea | | | | | | Male | 24,557,598.000 |
| 2015 | 7 | | | | | | Asia | Korea | | | | | | Fem | 24,557,598.000 |
| 2015 | 7 | | | | | | North | US | | | | | | Male | 153,032,792.381 |
| 2015 | 7 | | | | | | North | US | | | | | | Fem | 169,141,507.368 |
| 2015 | 7 | | | | | | Asia | China | | | | | | Male | 651,183,518.095 |
| 2015 | 7 | | | | | | Asia | China | | | | | | Fem | 719,729,151.579 |

NUMERICAL INFORMATION MANAGEMENT DEVICE ENABLING NUMERICAL INFORMATION SEARCH

TECHNICAL FIELD

The present invention relates to a numerical information management device enabling numerical information search according to a user's purpose.

BACKGROUND ART

A variety of information is formed socially or personally by human activities. At this time, a variety of information may be information related to texts, images, numerical values (figures), and the like.

Meanwhile, users have apply these information to research and development, decision making, etc. by utilizing statistics of such information. Therefore, the collection, accumulation, search and use of information depending on advanced science and technology may be one of indispensable acts in human intellectual activities in information society.

To this end, various resource management devices are disclosed. Korean Patent Registration No. 10-0535373 relates to an information search management system, and there are difficulties to searching, determining of relationship, and utilization of numerical information merely by providing and managing information including a keyword through general keyword search.

Accordingly, there is a need for a numerical information management device capable of searching or utilizing numerical information in accordance with a user's purpose and providing numerical information in an appropriate graph form to be determined at a glance.

DISCLOSURE

Technical Problem

An object of the present invention is to provide a numerical information management device enabling a numerical information search capable of providing a search service according to a user's purpose by structuring and managing numerical information in a single data structure.

Another object of the present invention is to provide a numerical information management device enabling a numerical information search capable of providing a search keyword extension search through a general search, a correlation search, and a dimensional search and illustrating and providing searching results as a graph.

Technical Solution

In order to achieve the objects described above, an exemplary embodiment of the present invention provides a numerical information management device enabling numerical information search comprising: a DB which separately stores cube data having a set row structure including at least one of a temporal viewpoint recording temporal information, spatial viewpoint recording spatial information, and a user viewpoint recording information other than the temporal information and the spatial information and a numerical value and metadata for analyzing the cube data and stores at least one graph template; a search unit receiving a search keyword and a search option; and a content providing unit which extracts metadata corresponding to the input search keyword and search option, extracts and analyzes the corresponding cube data using the extracted metadata, and generates and provides at least one graph.

The search unit may perform a predetermined multilingual translation for the search keyword using an external translation engine, and the content providing unit may provide a graph for the search keyword using at least one metadata and cube data corresponding to the multilingual translated search keyword.

The content providing unit may extract at least one first metadata including the input search keyword when the search option is a general search and provide a first result list including at least one first result graph using first cube data corresponding to the extracted first metadata.

The content providing unit may calculate a correlation coefficient for at least one viewpoint of a temporal viewpoint and a spatial viewpoint of the first cube data corresponding to the specific graph and a temporal viewpoint and a spatial viewpoint of the cube data stored in the DB when the search option is a correlation search for the specific graph and provide a second result list including at least one second result graph using at least one second cube data in which a correlation coefficient having a predetermined value or more is calculated.

The content providing unit may provide a regenerated result graph using at least one cube data including the input search keyword when the search option is a dimensional search.

The content providing unit may extract a graph template designated by the user or a recommended graph template from the DB and apply and provide the analyzed cube data to the extracted graph template.

The content providing unit may include a graph recommending unit which recommends a graph template according to the information recorded in the temporal viewpoint, the spatial viewpoint, and the user viewpoint of the extracted cube data or a unit of the numerical value.

The cube data may be configured by at least one set row forming a file and stored in the DB by a file unit.

In addition, the temporal viewpoint, the spatial viewpoint and the user viewpoint of the cube data may be divided into a plurality of viewpoints, and the plurality of viewpoints may be hierarchically divided into a higher concept and at least one lower concept depending on the higher concept, and each viewpoint may have a hierarchical name according to a hierarchical position.

The metadata may include file index information, a column name, analysis information, and management information corresponding to the cube data and may be stored in a relational table form, the column name may be defined by a hierarchical name order of each viewpoint included in the corresponding cube data, and the analysis information may include at least one of unit information for representing a numerical value included in the input numerical information, graph template information, hierarchical column names, language, and the like.

The hierarchical name in the temporal viewpoint may be tn, a hierarchical name in the spatial viewpoint may be ln, a hierarchical name in the user viewpoint may be Un, and n may be a hierarchical level.

The numerical information may be information having a numerical value input by the user or information having a numerical value collected from the Internet and a designated local network using a bot.

The numerical information management device may further comprise a content sharing unit which shares the graph provided by the content providing unit through a user-specified social network services/sites (SNS), a link URL, and a download.

Advantageous Effects

As described above, according to the present invention, the numerical information management device enabling a numerical information search may structure and manage numerical information in a single data structure to easily determine a relationship between the numerical information, thereby making it possible to provide a search service according to a user's purpose.

Further, it is possible to provide extended information related to a search keyword through a general search, a correlation search, and a dimensional search. In addition, a search result is schematized and provided in a graph to be easily determined by a user at a glance.

In addition, it is possible to enhance data security by separately storing cube data including numerical values and metadata analyzing the cube data.

Further, it is possible to provide a graph reflecting numerical information characteristics by recommending and providing an appropriate graph template base on a viewpoint of cube data.

Further, it is possible to utilize data by downloading a graph for numerical information or sharing the graph for numerical information through SNS, link URLs, etc.

Further, there is no need to re-prepare a calling query even if changes are made to the cube data by defining column names of cube data in a hierarchical name order, storing the column names in the metadata, and extracting the cube data by calling through a query or the like using the column names.

DESCRIPTION OF DRAWINGS

FIGS. 4 and 5 are diagrams illustrating cube data according to various embodiments of the present invention.

MODES OF THE INVENTION

Figure 1:
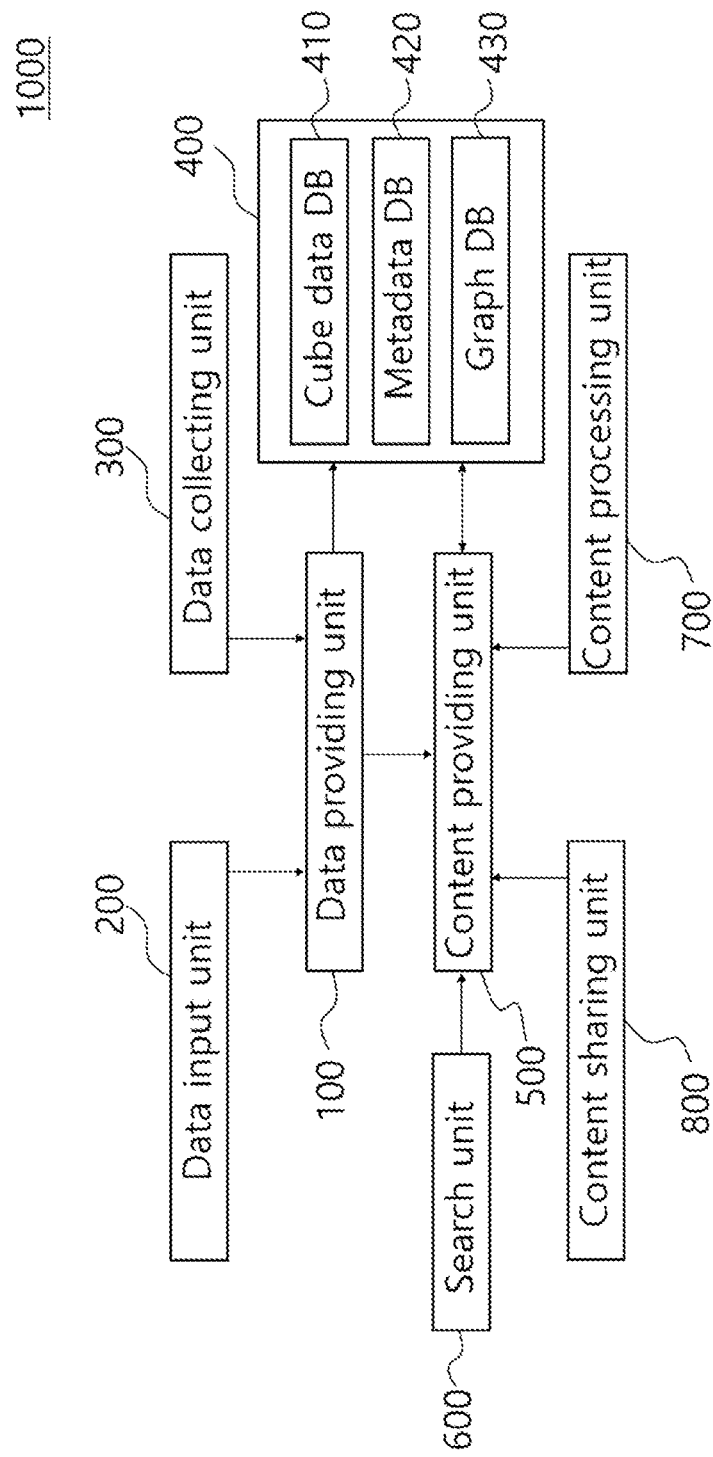
FIG. 1 is a block diagram illustrating a configuration of a numerical information management device enabling a numerical information search according to an exemplary embodiment of the present invention.

Terms and words used in the present specification and claims should not be interpreted as being limited to typical or dictionary meanings, but should be interpreted as having meanings and concepts which comply with the technical spirit of the present disclosure, based on the principle that an inventor can appropriately define the concept of the term to describe his/her own invention in the best manner.

Therefore, the exemplary embodiments described in the present specification and the configurations illustrated in the drawings are merely the most preferred embodiment of the present invention and are not intended to represent all of the technical ideas of the present invention, and thus, it should be understood that various equivalents and modifications capable of replacing the exemplary embodiments at the time of this application.

Hereinafter, before describing the present invention with reference to the drawings, in order to reveal the gist of the present invention, it is to be understood that unnecessary matters, that is, known configurations that can be easily added by those skilled in the art are not illustrated or not specifically described.

A numerical information management device enabling a numerical information search structures and databases various numerical information formed socially or personally by human activities in a predetermined data structure and provides the numerical information in an illustrated graph form according to a search option of a user. Accordingly, the user may easily determine the numerical information at a glance and provide a graph suitable for a search purpose of the user.

Figure 2:
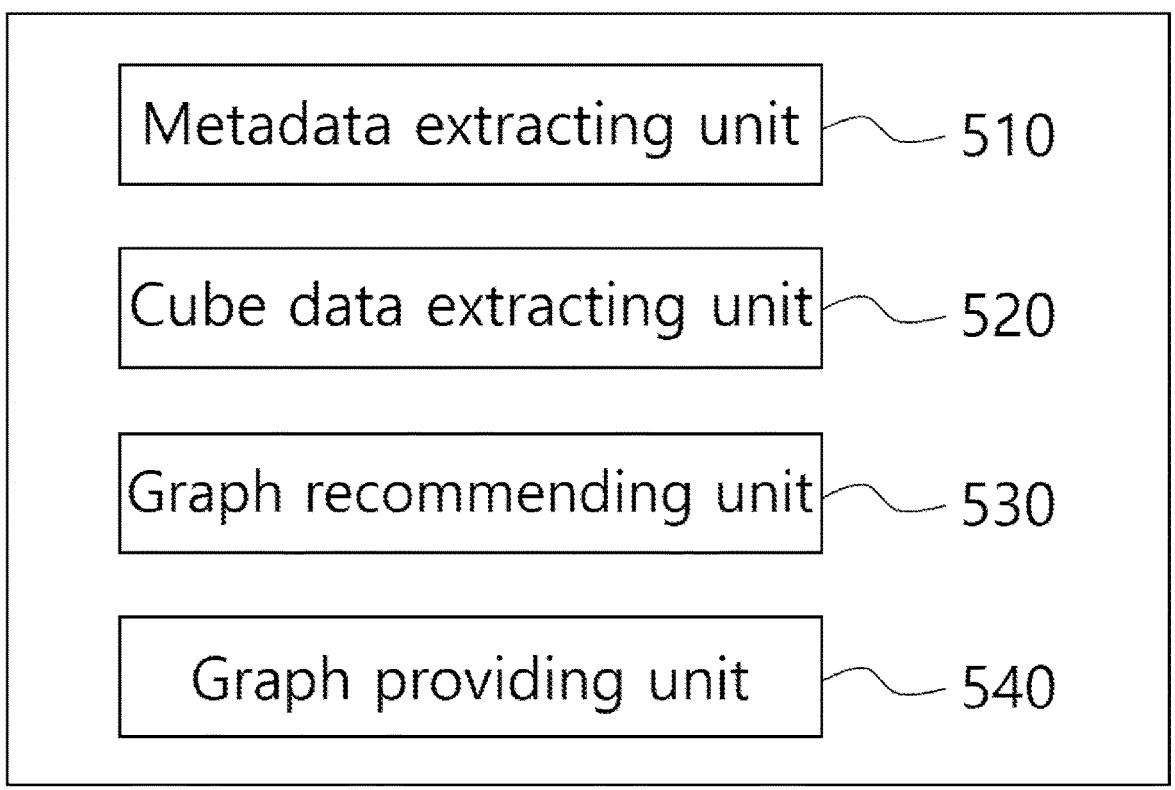
FIG. 2 is a block diagram illustrating a configuration of a content providing unit of FIG. 1.

FIG. 1 is a block diagram illustrating a configuration of a numerical information management device enabling a numerical information search according to an exemplary embodiment of the present invention. FIG. 2 is a block diagram illustrating a configuration of a content providing unit of FIG. 1.

Referring to FIG. 1, a numerical information management device 1000 enabling a numerical information search (hereinafter, referred to as a numerical information management device) according to an exemplary embodiment of the present invention may include a data structure unit 100, a data input unit 200, a data collecting unit 300, a DB 400, a content providing unit 500, a searching unit 600, a content processing unit 700, and a content sharing unit 800.

Referring to FIG. 2, the content providing unit 500 may include a metadata extracting unit 510, a cube data extracting unit 520, a graph recommending unit 530, and a graph providing unit 540.

The data structure unit 100 may convert inputted numerical information based on a structured data structure according to an exemplary embodiment of the present invention and store the converted numerical information in the DB 400.

The data input unit 200 may be a user interface for receiving numerical information from a user. At this time, the data input unit 200 may provide a user interface capable of inputting numerical information based on the data structure. The data input unit 200 may provide the numerical information input by the user to the data structure unit 100.

Meanwhile, the data input unit 200 may separately provide general numerical information and numerical information according to a special use. The special use will be described in FIG. 6.

Further, the data collecting unit 300 may search numerical information existing in an Internet network and a predetermined local network using a bot, collect the numerical information to be searched, and provide the collected numerical information to the data structure unit 100.

Here, the numerical information may be information related to the numerical values (figures) generated in the society and all information generating numerical values (figures) such as grades generated by students studying at school, an amount of card usage generated by an individual, height, weight, the number of objects occurring in nature, sales generated by the company, stock price, the number of customers, and production.

Figure 3:
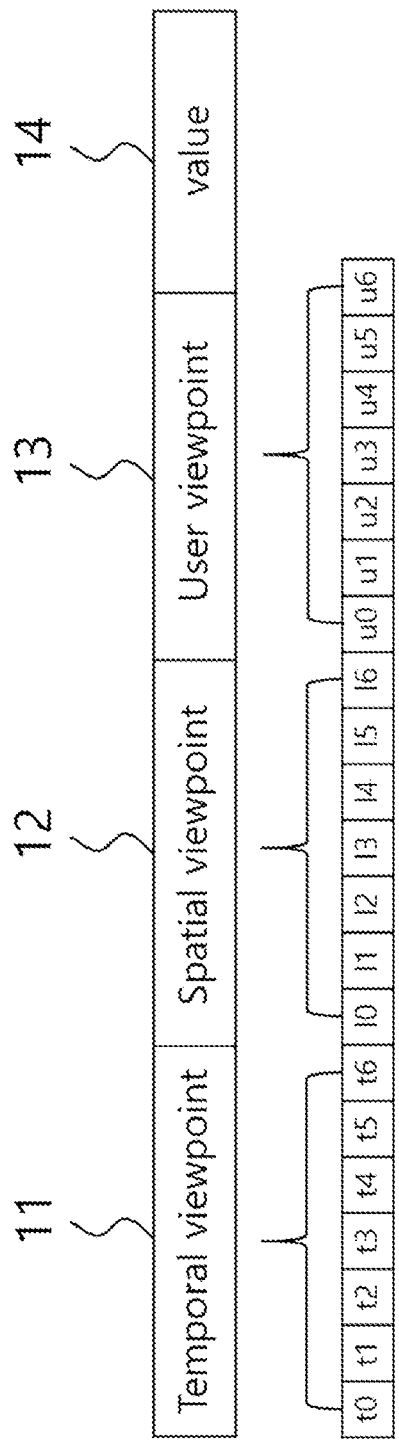
FIG. 3 is a diagram for describing a structure of cube data according to an exemplary embodiment of the present invention.
Figure 7:
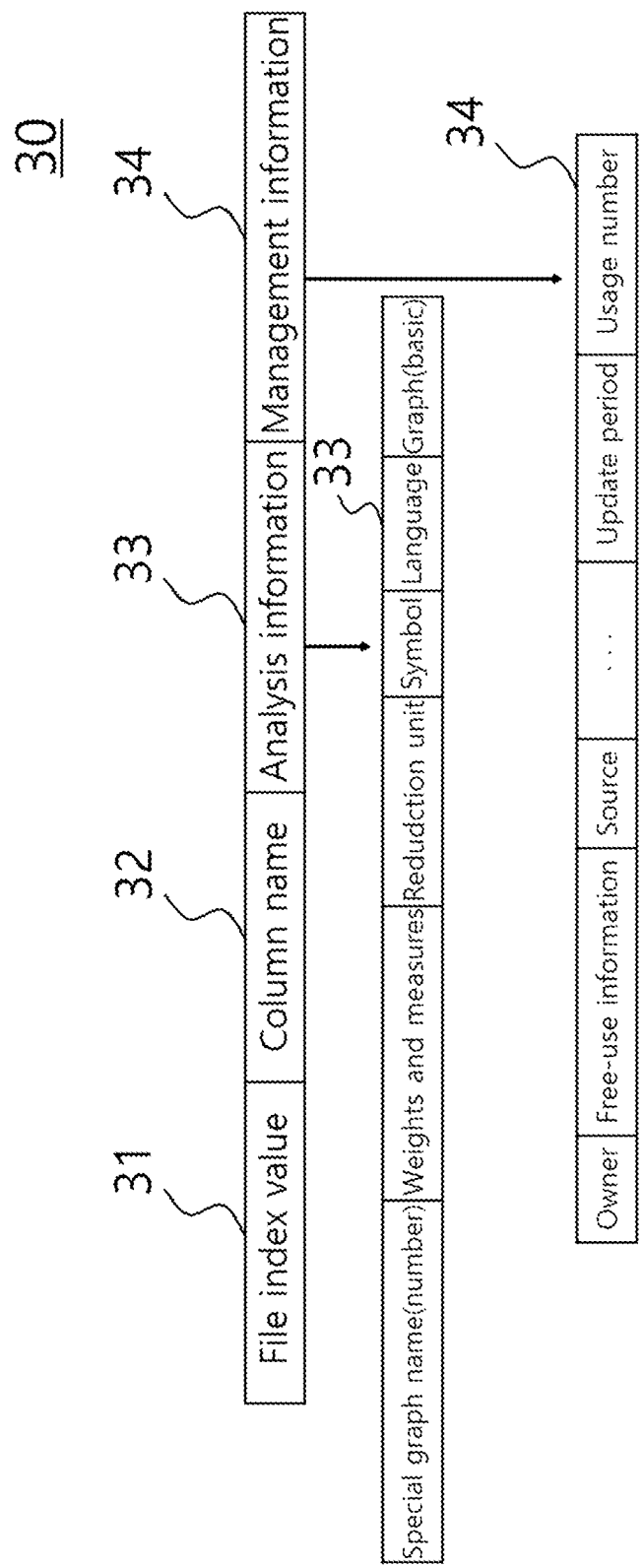
FIG. 7 is a diagram for describing metadata according to an exemplary embodiment of the present invention.

That is, the data structure unit 100 may convert the numerical information into cube data and metadata according to the data structure of the present invention, and store the cube data and the metadata in the DB 400. Here, the cube data is data including numerical values and may have a structure as illustrated in FIG. 3. In addition, the metadata may include information as illustrated in FIG. 7 as data for analyzing the cube data.

FIG. 3 is a diagram for describing a structure of cube data according to an exemplary embodiment of the present invention. Referring to FIG. 3, the cube data structure 10 has a set row structure including a temporal viewpoint 11 (tn) for recording temporal information, a spatial viewpoint 12 (ln) for recording spatial information, a user viewpoint 13 (Un) for recording information other than the temporal information and the spatial information, and a numerical value 14 (value).

In addition, the temporal viewpoint, the spatial viewpoint and the user viewpoint of the cube data are divided into a plurality of viewpoints (hierarchical levels: n), and the plurality of viewpoints are hierarchically divided into a higher concept and at least one lower concept depending on the higher concept, and each viewpoint may have a hierarchical name according to a hierarchical position.

For example, referring to FIG. 3, each viewpoint may be divided into seven hierarchies.

The temporal viewpoint 11 (tn) may be divided into seven hierarchies having hierarchical names t0 to t6. Here, t6 may be defined to mean the sixth hierarchy in terms of temporal viewpoint. In addition, each hierarchy of t0 to t6 may designate the following hierarchical column name. That is, t0 may be the highest concept and t6 may be the lowest concept.

TABLE 1

| t0 | t1 | t2 | t3 | t4 | t5 | t6 |
|---|---|---|---|---|---|---|
| Century | Year | Quarter | Month | Day | Time | User definition |

Further, the spatial viewpoint 12 (ln) may be divided into seven hierarchies having hierarchical names l0 to l6. Here, l2 may be defined to mean the second hierarchy in terms of spatial viewpoint. In addition, each hierarchy of l0 to l6 may designate the following hierarchical column name. That is, l0 may be the highest concept and l6 may be the lowest concept.

TABLE 2

| l0 | l1 | l2 | l3 | l4 | l5 | l6 |
|---|---|---|---|---|---|---|
| Continent | Country | Metropolitan city | Cities and towns | Eup/Myeon/Dong | User definition | User definition |

Further, the user viewpoint 13 (Un) may be divided into seven hierarchies having hierarchical names U0 to U6. Here, U1 may be defined to mean the first hierarchy in terms of the user viewpoint. Meanwhile, the user viewpoint 13 (Un) may be registered by the user at the time of inputting data through the data input unit 200 without designating the hierarchical column name as a basis. In addition, when collected through the data collection unit 300, the data structure unit 100 may apply the collected data using the data of the user viewpoint included in the collected numerical information. On the other hand, the hierarchical column names may be stored in the metadata.

For example, if the numerical information relates to the number of living things, the hierarchical column names may be given as follows.

TABLE 3

| U0 | U1 | U2 | U3 | U4 | U5 | U6 |
|---|---|---|---|---|---|---|
| Phylum | Class | Order | Family | Genus | Species | Subspecies |

Alternatively, if the numerical information relates to the price, the hierarchical column names may be given as follows.

TABLE 4

| U0 | U1 | U2 | U3 | U4 | U5 | U6 |
|---|---|---|---|---|---|---|
| Classification of business conditions | Classification of business types | Classification of products | Product names | — | — | — |

Meanwhile, the cube data has a set row structure to be extended in a row direction. At this time, the cube data may be configured by a plurality of set rows and the plurality of set rows may form one file. That is, the cube data may be formed for each file.

The data structure unit 100 may extract at least one of the temporal viewpoint 11 (tn), the spatial viewpoint 12 (ln), and the user viewpoint 13 (Un) and the numerical value 14 (value) from the numerical information input by the data input unit 200 and the data collecting unit 300 according to the cube data structure 10 illustrated in FIG. 3 and recode the extracted viewpoint and numerical value in a corresponding area to generate cube data. Thus, if the numerical information includes only the temporal viewpoint, the cube data may have only the temporal viewpoint and the numerical value.

In addition, the data structure unit 100 may store the generated cube data in the cube data DB 410 of the DB 400 in a file unit. On the other hand, the cube data generated in a file unit may have an exemplary embodiment as illustrated in FIGS. 4 and 6.

Figure 5:

FIGS. 4 and 5 are diagrams illustrating cube data according to various exemplary embodiments of the present invention. Referring to FIG. 4, the cube data 20 is generated from numerical information on 'the number of male and female population (file) by country in July, 2015', and includes the number of population as t2 and t3 as hierarchical values for hierarchies of t1 and t3 as the temporal viewpoint, l0 and l2 as the spatial viewpoint, and U0 and U1 as the user viewpoint and the numerical value for each set row. In this case, the corresponding cube data may have column names of 't2, t3, l0, l2, U0, and U1', and such column name information may be stored in the corresponding metadata.

Alternatively, as illustrated in FIG. 5, when the cube data 20 are generated from numerical information on 'distance (file) from the sun for each planet', the cube data may include only a user viewpoint and a numerical value (distance). In this case, the corresponding cube data may have a column name of 'U0', and such column name information may be stored in the corresponding metadata.

Figure 6:
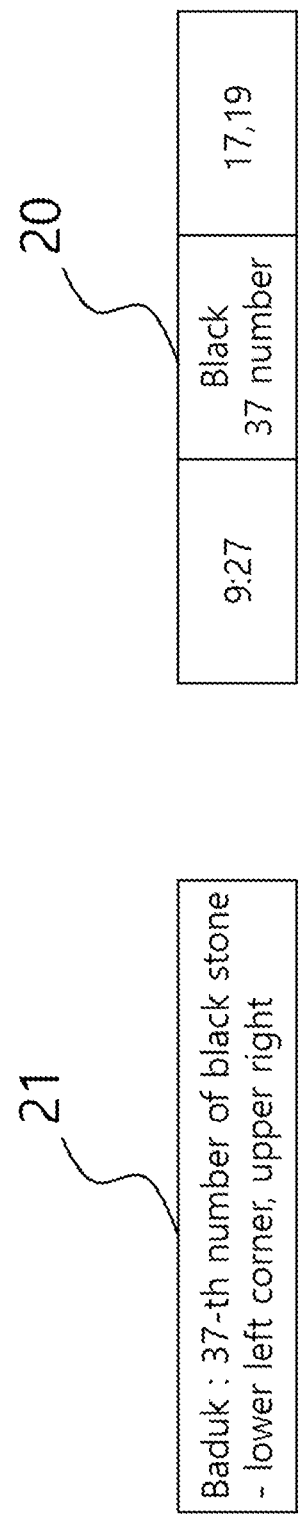
FIG. 6 is a diagram for describing special-use cube data according to an exemplary embodiment of the present invention.

Meanwhile, the data structure unit 100 may generate the cube data 20 from the numerical information for a special use as illustrated in FIG. 6. At this time, the special use may be numerical information prepared for a specific purpose, such as map coordinates, baduk, game records genealogy, time tables, body management tables, and molecular formulas. That is, unlike general numerical information that may be represented by a general graph, a special graph suitable for a specific purpose may be required numerical information.

For example, FIG. 6 may illustrate numerical information 21 on the record of baduk and cube data 20 for numerical information. At this time, if a position of the 27th number of black stones is a position of a lower left corner 17 and an upper right corner 19 of the baduk board, the cube data may have a time t5 as the temporal viewpoint, a black or white number U0 as the user viewpoint, and a numerical value.

At this time, the numerical value may be recorded by a predetermined method in accordance with the special use. In the case of baduk, the numerical value may be recorded as 'left reference position—decimal point—right reference position'. Thus, the numerical value becomes 17.19, and the cube data includes a plurality of set rows over time.

Meanwhile, the data structure unit 100 generates cube data based on the data structure from the numerical information and generates metadata for analyzing the generated cube data to store the generated metadata in the metadata DB 420 of the DB 400. At this time, the information included in the metadata may be stored in the form of a relational table. Thus, data security may be enhanced by storing and managing the metadata separately from the cube data.

FIG. 7 is a diagram for describing metadata according to an exemplary embodiment of the present invention. Referring to FIG. 7, the metadata 30 may include file index information 31, a column name 32, analysis information 33, and management information 34 corresponding to the corresponding cube data.

Here, the file index information 31 may be an index value for extracting cube data stored in file units, a file name (graph name), and the like. The column name 32 is defined by a hierarchical name order of each viewpoint included in the corresponding cube data, and if the corresponding cube data includes the temporal viewpoint t1, the user viewpoint U0, and the numerical value (value), a column name of the corresponding cube data may be 't1, U0'.

The analysis information 33 is for analyzing a relationship between hierarchies and numerical values included in the cube data and may include at least one of unit information for representing a numerical value included in the input numerical information, graph template information, hierarchical column names, language, and the like.

Here, the unit information may be classified into weights and measures, a reduction unit, and symbols. The weights and measures may be numeric value units such as a weight, a length, a number, and a unit of money. In addition, the reduction unit is a unit for expressing a reduction in the case of a large unit of a numerical value, and for example, if the reduction unit is 10,000 and the numerical value is 1, it may be interpreted as a unit of 10,000. Also, the reduction unit may be used to represent a multiplier. For example, the reduction unit for $10^6$ may be 6. The symbols may be applied when using numerical values such as multiplier, root, and pie.

In addition, the graph template information may be graph template information capable of displaying numerical information according to a special use of the numerical information. In the case of the special use, only a preset number is described, and the analysis method is stored and used separately, thereby reducing the amount of metadata.

Further, the language may be a language name representing each hierarchical value of the cube data.

Meanwhile, the management information 34 is additional information for data management, and may include an owner of the numerical information, a source, the number of using times of the corresponding cube data, a update period, and free-use information according to the use of the information.

The DB 400 may separately store the cube data 20, the metadata 30, and the graph template generated by the data structure unit 100.

The cube data DB 410 may store the cube data separately by a file unit.

The metadata DB 420 may store the metadata in the form of a relational table.

The graph template DB 430 stores various graphs, which may be divided into special-use graphs and general graphs.

The content providing unit 500 may extract the metadata corresponding to a search keyword and a search option input by the searching unit 600 and extract the corresponding cube data using the extracted metadata. Further, the content providing unit 500 may analyze the corresponding cube data using the information of the extracted metadata to provide a graph. Alternatively, when inputting numerical information by the data input unit 200, the content providing unit 500 may provide a graph using the metadata and the cube data generated by the data structure unit 100.

When the search keyword and the search option are input, the search unit 600 may perform a predetermined multilingual translation for the search keyword through a predetermined external translation engine. The search unit 600 may provide a search keyword, a plurality of multilingual translated keywords, and a search option to the content providing unit 500.

Here, the search option may be one of a general search, a correlation search, and a dimensional search. The search option may also include a search range. The search range may also be designated by the user.

The general search may extract at least one first metadata including the input search keyword, provide a result list including at least one result graph generated using first cube data corresponding to the first metadata, and enlarge and provide a specific graph selected by the user.

The correlation search may extract at least one second cube data having a correlation forming a similar pattern to a temporal and spatial pattern of the specific graph selected by the user in the result list of the general search, provide a result list including at least one result graph generated using the extracted second cube data, and enlarge and provide the specific graph selected by the user.

The dimensional search may extract and provide at least one third cube data including the inputted search keyword and generate and provide a result graph using the third cube data selected by the user.

Here, the first metadata may be metadata including a search keyword, and the first cube data may be cube data corresponding to the first metadata. In addition, the second cube data may be cube data having a correlation with the first cube data. In addition, the third cube data may be cube data including a search keyword.

The metadata extracting unit 510 may extract metadata including a hierarchical column name corresponding to the search keyword in the general search. At this time, similar words of the search keyword may be extracted.

The cube data extracting unit 520 may extract the corresponding cube data using file index information and a column name included in the metadata extracted by the metadata extracting unit 510. Further, the cube data extracting unit 520 may calculate a correlation coefficient by comparing hierarchical value patterns of the temporal viewpoint and the spatial viewpoint of the cube data corresponding to a specific graph which is a correlation search object in the correlation search with hierarchical value patterns of the temporal viewpoint and the spatial viewpoint of each cube data stored in the cube data DB 410 and extract cube data having a predetermined value or more of the correlation coefficient. At this time, the hierarchical structure of the cube data may be used to provide a correlation through drill-up or drill-down analysis.

At this time, the correlation coefficient may be calculated by using a general correlation function (Correl function). In general, the correlation coefficient may express a degree of correlation between two variables measured as a score as −1 and 1. In this case, the closer to −1, the higher the negative (−) correlation, and the closer to +1, the stronger the positive (+) correlation, and the closer to 0, there is no correlation between the two variables. Therefore, the predetermined value may be set to a value close to 1.

In addition, the cube data extracting unit 520 may extract cube data having a hierarchical value corresponding to a search keyword in the dimensional search. The cube data extracting unit 520 may provide the extracted cube data to the graph providing unit 540. Alternatively, the cube data extracting unit 520 may provide only the extracted cube data through a display unit (not illustrated) according to a user request.

The graph recommending unit 530 may recommend a graph template according to the information recorded in the temporal viewpoint, the spatial viewpoint, and the user viewpoint of the extracted cube data or recommend a graph template having a high user usage number.

For example, the graph recommending unit 530 may recommend a multi-bar series when there are the temporal viewpoint, the spatial viewpoint, and the user viewpoint, recommend a curved-line series if there is a time dimension, recommend a bar series if there is a space dimension, and recommend a radial series if there is one viewpoint and a hierarchy value is 6 or less.

The graph providing unit 540 may analyze the cube data extracted by the cube data extracting unit 510 using the analysis information of the metadata extracted by the metadata extracting unit 520 and extract a graph template corresponding to the analyzed cube data to provide a graph of the search keyword according to a search option.

At this time, the recommended graph template of the graph recommending unit 530 may be used or a graph template designated by the user may be used. On the other hand, special graphs may be applied for special uses.

Meanwhile, FIGS. 8 to 11 illustrate result windows for providing result lists and graphs provided by the graph providing unit 540 in correspondence with a search keyword and a search option.

Figure 8:
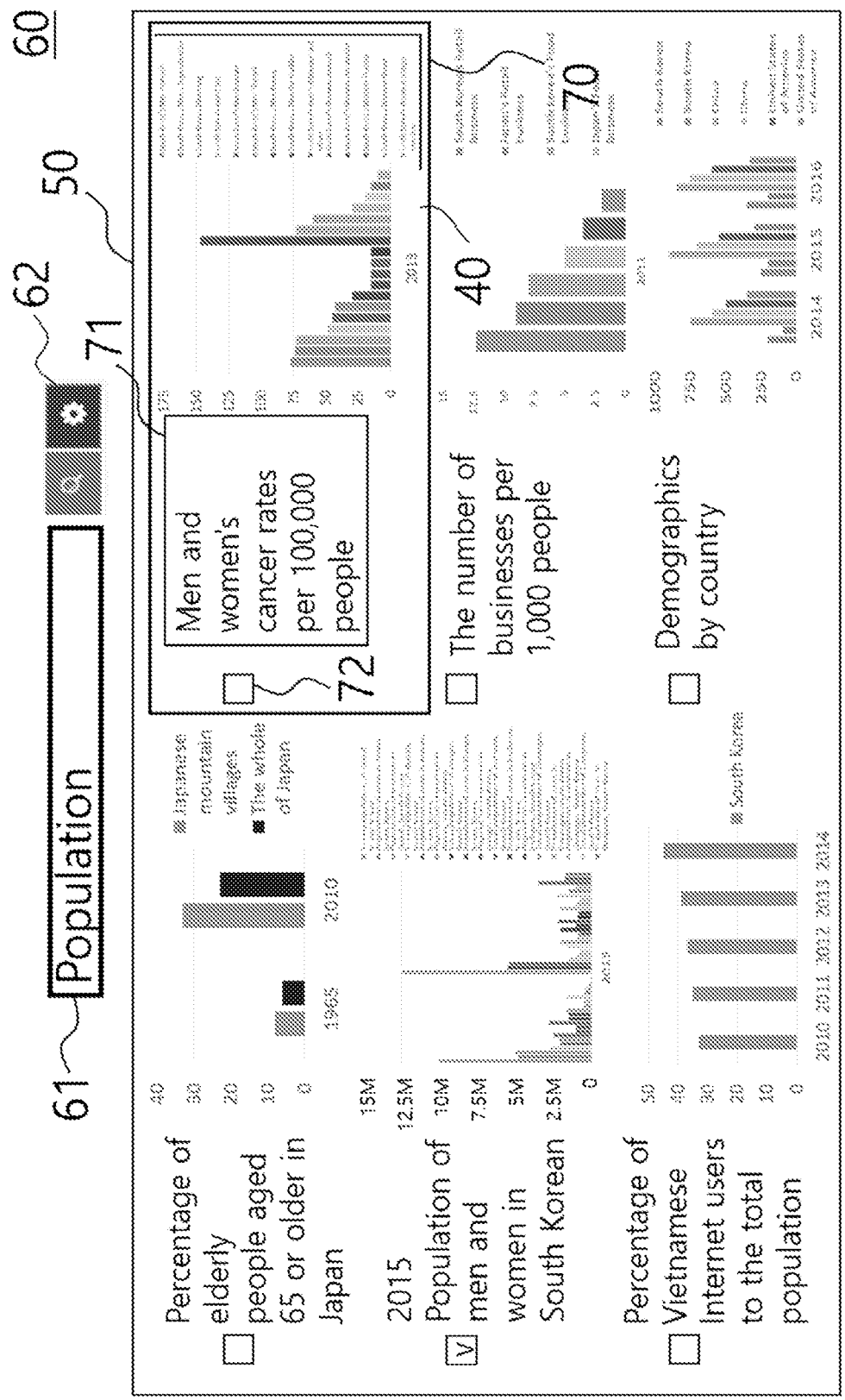
FIGS. 8 to 11 illustrate result lists and graphs provided in response to search keywords and search options.

Referring to FIG. 8, a search keyword 'population' may be input in a search window 61, and a general search may be selected as a search option 62. At this time, a result list 50 including at least one search result 70 may be provided through the result window 60. In addition, the search result 70 may include a corresponding file name or graph name 71, a result graph 40, and a selection window 72.

Figure 9:
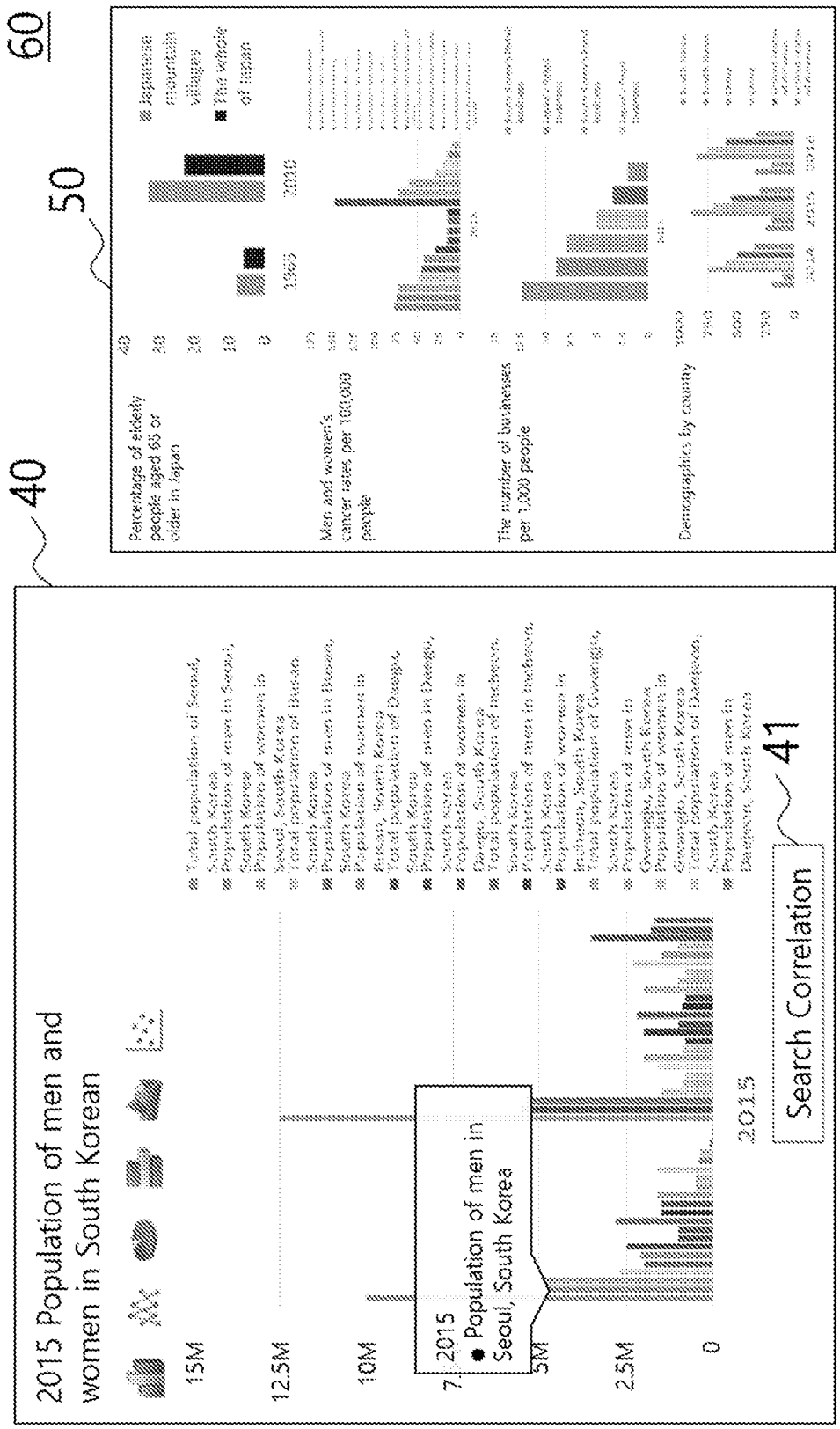

The result list 50 may be a result list obtained by extracting first metadata including 'population' in a hierarchical column name and a file name of the metadata stored in the metadata DB 420. At this time, the result list 50 may be selected by the user through the selection window 72, and when a specific result 70 is selected, the a corresponding result graph 40 for the selected specific result 70 may be provided together with the result list 50 as illustrated in FIG. 9. At this time, A correlation search may be performed by selecting a correlation search button 41 on the result graph selected in FIG. 9.

Figure 10:
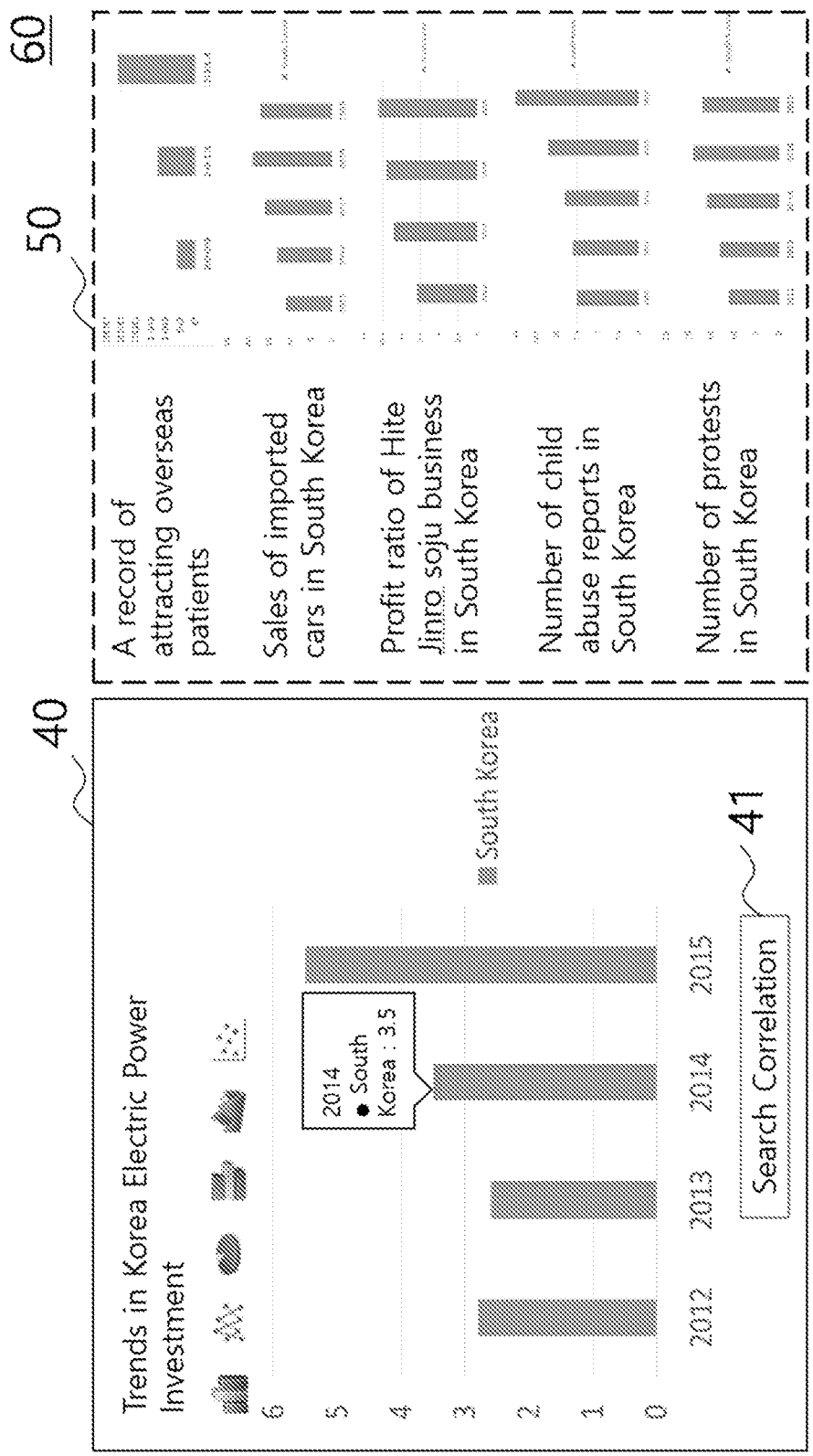

Meanwhile, when a correlation search for a specific result graph 40 (a result graph selected from the result list of the general search) is input by the user, as illustrated in FIG. 10, second metadata having a correlation is extracted through the result window 60 to provide the result list 50. At this time, the result list 50 may include graphs that form a similar pattern having a correlation with a specific graph selected by the user.

Figure 11:
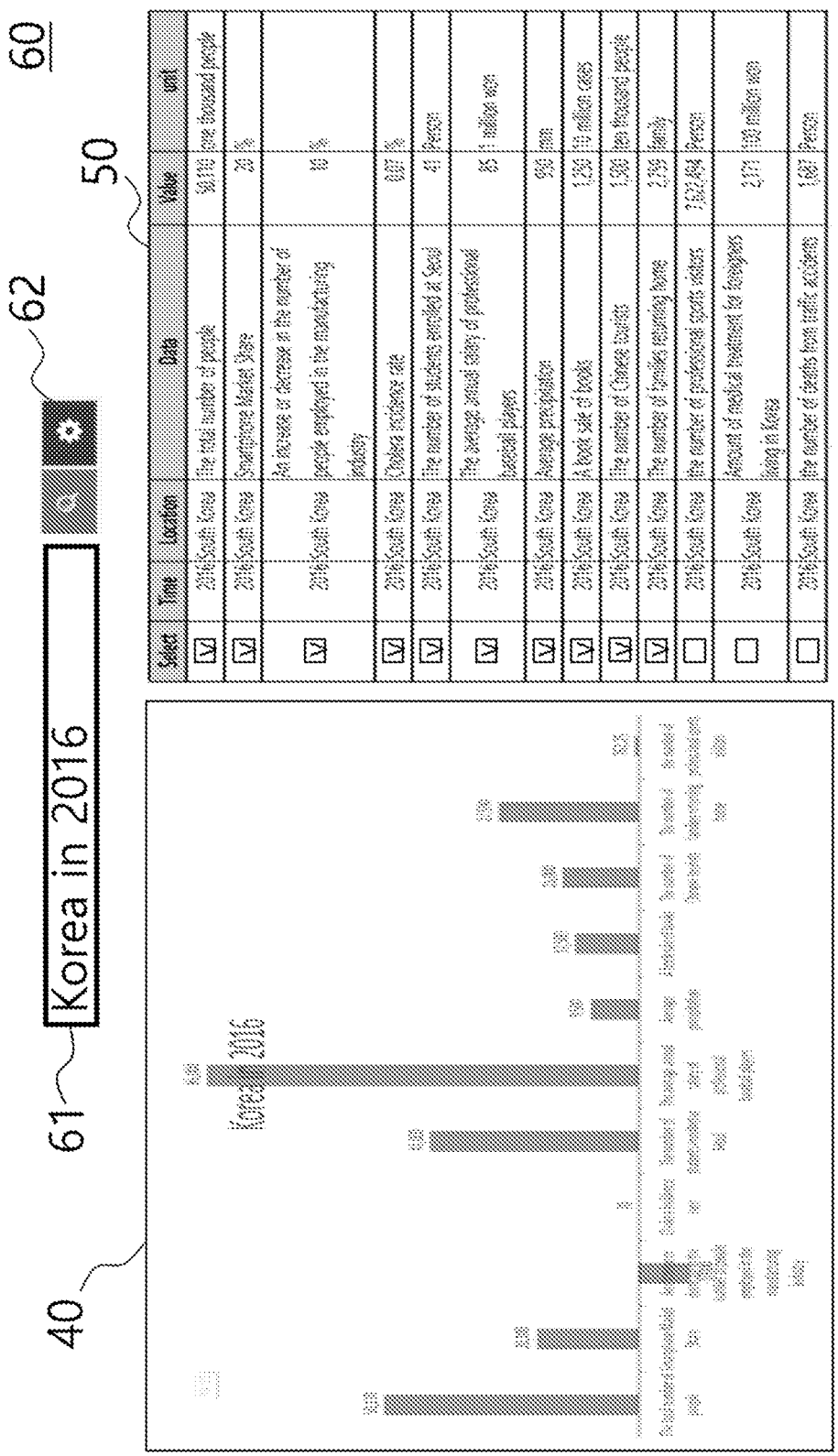

Further, FIG. 11 illustrates a result window 60 for providing a result graph 40 and a result list 50 according to the dimension search and may be a case where a search keyword '2016 Korea' is input by the search window 61 and the search option 62 is a dimensional search.

In the dimensional search, it is possible to provide the result list 50 through the extraction of third cube data that '2016' is included in a hierarchical value of the temporal viewpoint among the cube data stored in the cube data DB 410 and 'Korea' is commonly included in a hierarchical value of the spatial viewpoint, and the result graph 40 generated using specific results selected by the user in the result list 50.

Meanwhile, when the cube data download for the provided graph is requested, the content providing unit 500 may provide the corresponding cube data as one of an Excel file and a Text file according to the free-use information. At this time, the provided cube data may include only valid data from which null data is removed.

When processing of the search result data is requested by the user, the content providing unit 500 may provide the corresponding cube data to the content processing unit 700 and regenerate and provide a new graph for the cube data processed by the content processing unit 700. At this time, the data processing may be one of correction, division, deletion, and merging. Thus, collaboration among a plurality of users is possible.

The content processing unit 700 may perform at least one of correction, division, deletion, extension, and merging in a set row unit of the cube data according to a user input. At this time, the merging may be performed in a set row unit for at least two pieces of cube data in which unit information of the metadata is matched, and the extension may be performed in a set row unit for at least two pieces of cube data in which at least one of the hierarchical column names are matched.

The content sharing unit 800 may provide a graph provided by a display unit (not illustrated) in the content providing unit 500 through a user-specified social network services/sites (SNS), a link URL, and a download. Accordingly, the user may share a desired graph using the numerical information or use the graph as utilization data.

Meanwhile, only the main points of the present invention are described above using FIGS. 1 to 11, and it will be apparent that the present invention is limited to the configurations of FIGS. 1 to 11 so long as various designs can be made within the technical scope of the present invention.

The invention claimed is:

1. A numerical information management device enabling a numerical information search comprising:

a database (DB) which stores cube data having a set row structure including at least one of a temporal viewpoint recording temporal information, spatial viewpoint recording spatial information, and a user viewpoint recording information other than the temporal information and the spatial information, and stores a numerical value and metadata for analyzing the cube data, the metadata being stored separately from the cube data, and stores at least one graph template;

a search unit receiving an input search keyword and a search option; and a content providing unit which extracts metadata corresponding to the input search keyword and search option, extracts and analyzes corresponding cube data using the extracted metadata, and generates and provides at least one graph;

wherein the content providing unit calculates a correlation coefficient for at least one viewpoint of a temporal viewpoint and a spatial viewpoint of first cube data corresponding to a specific graph and a temporal viewpoint and a spatial viewpoint of the cube data stored in the DB when the search option is a correlation search for the specific graph and provides a second result list including at least one second result graph using at least one second cube data in which a correlation coefficient having a predetermined value or more is calculated.

2. The numerical information management device of claim 1, wherein the search unit performs a predetermined multilingual translation for the search keyword using an external translation engine, and the content providing unit provides a graph for the search keyword using at least one metadata and cube data corresponding to the multilingual translated search keyword.

3. The numerical information management device of claim 1, wherein the content providing unit extracts at least one first metadata including the input search keyword when the search option is a general search and provides a first result list including at least one first result graph using first cube data corresponding to the extracted first metadata.

4. The numerical information management device of claim 1, wherein the content providing unit provides a regenerated result graph using at least one cube data including the input search keyword when the search option is a dimensional search.

5. The numerical information management device of claims 1, wherein the content providing unit extracts a graph template designated by a user or a recommended graph template from the DB and applies and provides the analyzed cube data to the extracted graph template.

6. The numerical information management device of claim 5, wherein the content providing unit includes a graph recommending unit which recommends a graph template according to information recorded in the temporal viewpoint, the spatial viewpoint, and the user viewpoint of the extracted cube data or a unit of the numerical value.

7. The numerical information management device of claim 1, wherein the cube data is configured by at least one set row forming a file and stored in the DB by a file unit.

8. The numerical information management device of claim 1, wherein the temporal viewpoint, the spatial viewpoint and the user viewpoint of the cube data are divided into a plurality of viewpoints, and the plurality of viewpoints are hierarchically divided into a higher concept and at least one lower concept depending on the higher concept, and each viewpoint has a hierarchical name according to a hierarchical position.

9. The numerical information management device of claim 8, wherein the metadata includes file index information, a column name, analysis information, and management information corresponding to the cube data and is stored in a relational table form, the column name is defined by a hierarchical name order of each viewpoint included in the corresponding cube data, and the analysis information includes at least one of unit information for representing a numerical value included in the input numerical information, graph template information, hierarchical column names, or language.

10. The numerical information management device of claim 8, wherein the temporal viewpoint has a first hierarchical name, the spatial viewpoint has a second hierarchical name different from the first hierarchal name, and the user viewpoint has a third hierarchical name different from the first hierarchal name and the second hierarchical name each of the first, second and third hierarchical names corresponding to a hierarchical level.

11. The numerical information management device of claim 1, wherein the numerical information is information having a numerical value input by a user or information having a numerical value collected from the Internet and a designated local network using a bot.

12. The numerical information management device of claim 1, further comprising:

a content sharing unit which shares the graph provided by the content providing unit through a user-specified social network services/sites (SNS), a link URL, and a download.

* * * * *